H. W. WILSON.
COUPLING KEEPER.
APPLICATION FILED NOV. 29, 1920.
1,392,099.
Patented Sept. 27, 1921.
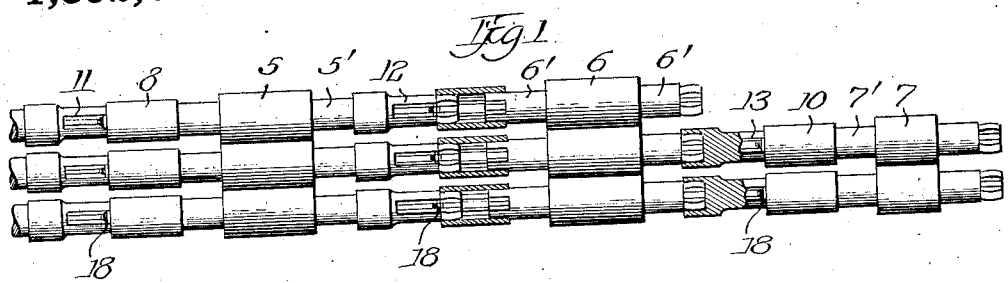
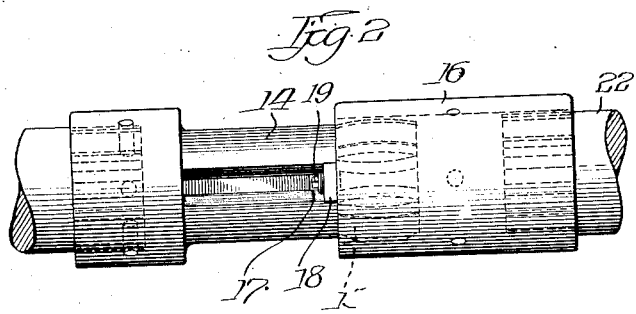
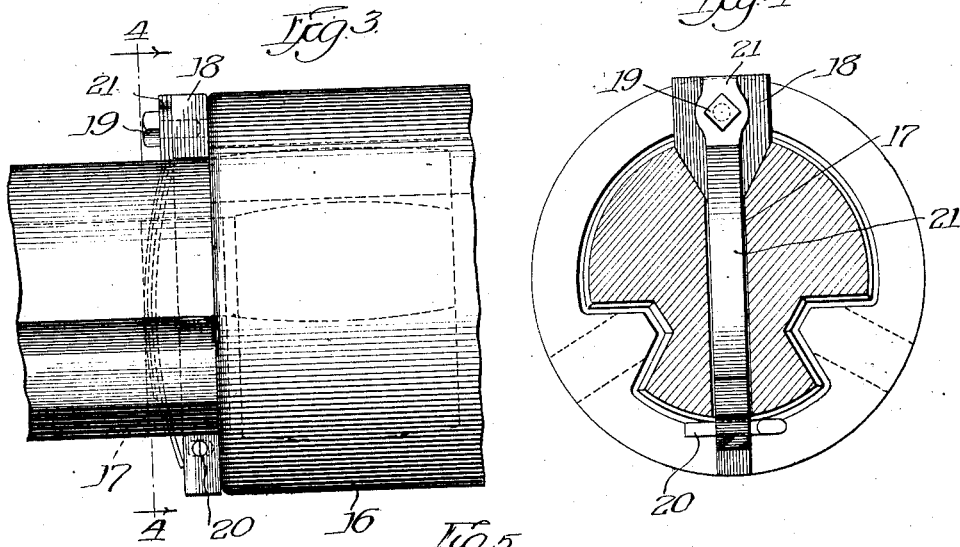
Witness:
Fred C. Harrion
Inventor:
Henry W. Wilson
By L. Anthony Usina
Atty.

UNITED STATES PATENT OFFICE.

HENRY W. WILSON, OF DULUTH, MINNESOTA.

COUPLING-KEEPER.

1,392,099.  Specification of Letters Patent.  Patented Sept. 27, 1921.

Application filed November 29, 1920. Serial No. 427,028.

*To all whom it may concern:*

Be it known that I, HENRY W. WILSON, a citizen of the United States, residing at Duluth, in the county of St. Louis and State of Minnesota, have invented certain new and useful Improvements in Coupling-Keepers, of which the following is a specification.

This invention relates to a new and improved keeper adapted to be associated with a coupling in a rolling mill, and more particularly which is adapted to retain the coupling yieldably in predetermined relation with the associated members.

In rolling mill practice it is customary to connect a spindle to a wabbler on the end of the roll neck by means of a coupling. The spindle is in turn connected either to an engine drive shaft or to another roll where the mill has a plurality of stands. This coupling connection must be adapted to permit longitudinal play in order that it may slide over the wabbler on the roll. Once it is placed in position by sliding from the spindle onto the roll wabbler, it is necessary to provide means adapted to prevent it from sliding back on the spindle.

In the present practice it is customary to place blocks, usually of wood, in the spindle grooves and to hold these blocks in place by means of a wire, a band of iron or sometimes by a leather strap or piece of old belting. This is a very crude and inefficient arrangement and in high speed mills the blocks are liable to work loose and cause trouble. These stretcher blocks must not retain the coupling fixedly against the roll neck, for a certain amount of longitudinal play is necessary in the coupling, but it is highly desirable that there be no lost motion or rack of the parts.

It is an object of the present invention to provide means adapted to yieldably retain a coupling in predetermined relation to a spindle and roll wabbler or to similar structures with which it may be associated. It is a further object to provide a device of this character adapted for use in heavy machinery and which is capable of standing the heavy strains incident to such service. It is an additional object to provide a device which is simple in construction, positive in operation, and relatively inexpensive of manufacture and installation. Other and further objects will appear as the description proceeds.

My device comprises broadly a construction whereby the coupling is held in place by spring tension. This is accomplished in the preferred form by means of a leaf spring associated with the coupling and passing through a transverse slot in the spindle.

I have illustrated a preferred form of my invention in the accompanying drawings, in which—

Figure 1 is a diagrammatic showing of a three high, three stand mill adapted to show the application of my device;

Fig. 2 is an enlarged showing of a spindle and coupling provided with my invention, together with their associated wabblers;

Fig. 3 is an enlarged view showing the device and the adjacent end of the coupling and spindle;

Fig. 4 is a section taken on line 4—4 of Fig. 3; and

Fig. 5 is a detail view of the keeper spring and guide bar.

As shown in Fig. 1, the rolls 5, 6 and 7 having the roll necks 5', 6' and 7' connected in a series by the couplings 8, 9 and 10 and the spindles 11, 12 and 13. This connection is adapted to permit a certain amount of eccentricity of the adjacent rolls. To this end the connection is secured by means of wabblers received in the couplings according to rolling mill practice.

As shown in Fig. 2, the spindle 14 is provided with the wabbler 15 which is received in one end of the coupling 16. The spindle adjacent the coupling is provided with the transverse slot 17. As best shown in Fig. 3, the guide bar 18 is located in the slot 17 adjacent the coupling 16, the lower end of the bar being provided with the cotter pin 20. The leaf spring 21 is retained upon the bar 18 by the cap screw 19 and extends downwardly through the slot 17. The spring is bowed outwardly so that its face bears resiliently against the adjacent face of the slot 17. The coupling 16 is thus yieldably urged to the right by the spring 21 and is held against the roll neck 22 as shown in Fig. 2. The guide bar 18 serves to limit longitudinal movement to the right and further protects the spring 21 against lateral stresses. As shown in Fig. 4, the bar 18 has its upper portion shaped to substantially interfit with a groove in the spindle.

It may readily be seen that my construction is capable of quick and easy dismantling and assembling, the bar 18 carrying with it the spring 21 being withdrawn radially from the slot 17 after removal of the cotter pin 20. The coupling may then be slid longitudinally upon the spindle to clear the roll wabbler. This operation is reversed to engage the wabbler upon a new roll. Obviously this construction is much more efficient than the practice of retaining a coupling in place by the stretcher blocks held in place by the straps or wires. It is susceptible of much more rapid removal and replacement and has a further and even more important advantage in that it is not likely to become loose or give way in use. Another great advantage lies in a saving in wear both on the coupling and the spindle as well as upon the roll wabbler due to the fact that the coupling is held upon the full surface of the wabbler by the spring tension.

While I have described more or less precisely the details of construction of my invention, I do not wish to be understood as limiting myself thereto, as I contemplate changes in form and the proportion of parts and substitution of equivalents as circumstances may suggest or render expedient, without departing from the spirit of my invention.

I claim:

1. A shaft, a coupling associated therewith, a slot in the shaft, and spring means thrusting against the coupling and adapted to engage the slot to yieldingly retain the coupling in predetermined longitudinal relation to the shaft.

2. A shaft, a coupling associated therewith, a transverse slot in the shaft, and spring means thrusting against the coupling and adapted to extend through the slot to yieldingly retain the coupling in predetermined longitudinal relation to the shaft.

3. A shaft, a coupling associated therewith a transverse slot in the shaft and a leaf spring thrusting against the coupling and adapted to engage the slot to yieldingly retain the coupling in predetermined longitudinal relation to the shaft.

4. In a rolling mill, a spindle shaft having a wabbler, a roll, a coupling having one end associated with the wabbler and the other end engaging the face of the roll neck, and means adapted to yieldingly retain the coupling against the face of the roll neck.

5. In a rolling mill, a spindle shaft having a wabbler, a roll, a coupling having one end associated with the wabbler and the other end engaging the face of the roll neck, and spring means carried by the shaft and engaging the coupling adapted to yieldingly retain the coupling against the face of the roll neck.

6. In a rolling mill, a spindle shaft having a wabbler, a roll, a coupling having one end associated with the wabbler and the other end engaging the face of the roll neck, a slot in the shaft, and spring means adapted to engage the slot and the coupling to yieldingly retain the coupling against the face of the roll neck.

7. In a rolling mill, a spindle shaft having a wabbler, a roll, a coupling having one end associated with the wabbler and the other end engaging the face of the roll neck, a transverse slot in the shaft, and a leaf spring adapted to extend through the slot to yieldingly retain the coupling against the face of the roll neck.

8. A shaft, a coupling associated therewith, means adapted to yieldingly maintain the shaft and coupling in predetermined relation upon the shaft, and a member adapted to positively limit relative longitudinal movement between the coupling and shaft.

9. A shaft, a coupling associated therewith, spring means carried by one of said members and thrusting against the other member to yieldingly maintain the members in predetermined relation, and a bar carried by one member and engaging the other member in such manner as to positively limit relative longitudinal movement therebetween.

10. A shaft, a coupling associated therewith, a transverse slot in the shaft, a leaf spring and a bar carried by the shaft and extending through the slot in the shaft, the spring being adapted to engage a side of the slot and the bar coupling adjacent the opposite side of the slot whereby the parts are resiliently urged relative to each other by the spring, their relative movement being limited by the bar.

Signed at Duluth, Minnesota, this 15th day of Nov., 1920.

HENRY W. WILSON.